Nov. 9, 1943.   G. A. LOWREY   2,333,802
FISHING TOOL
Filed April 2, 1942
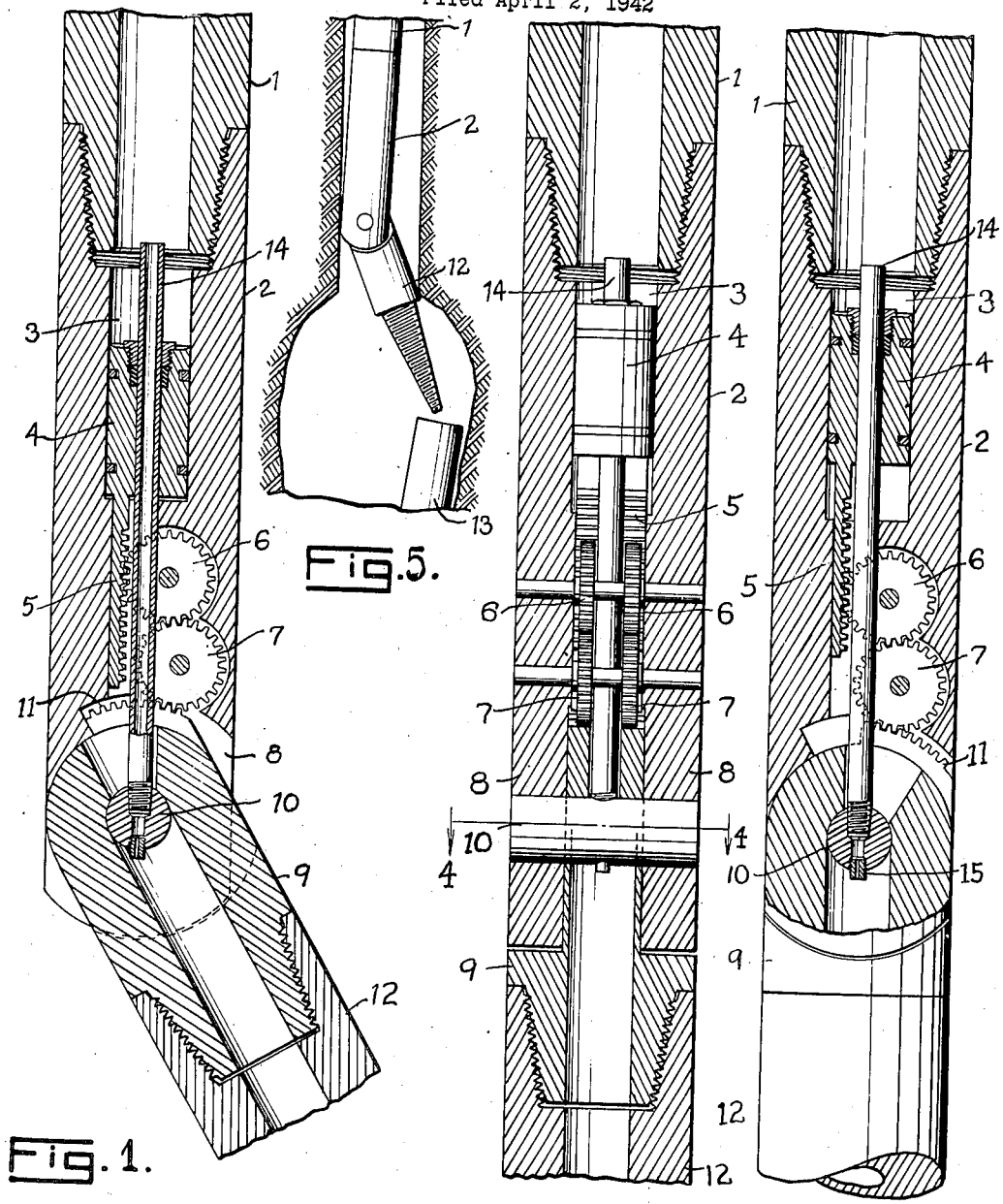
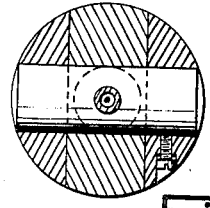
INVENTOR.
GEORGE A. LOWREY
BY E. V. Hardway
ATTORNEY.

Patented Nov. 9, 1943

2,333,802

UNITED STATES PATENT OFFICE 2,333,802

FISHING TOOL

George A. Lowrey, Houston, Tex.

Application April 2, 1942, Serial No. 437,461

2 Claims. (Cl. 294—86)

The invention relates to fishing tool equipment designed to be lowered into a well and engaged with an object in the well bore to be fished out.

It is often desirable that the grapple of the fishing tool be flexibly connected to the operating string so that its angular relation to the string can be changed. This is desirable for the reason that the upper end of the pipe, or other object, to be fished out often lays over against the side of the well bore or the side of a cavity in the well and therefore is not in alignment with the operating string.

The invention, therefore, embodies means for changing the direction of the fishing tool grapple so that it may be engaged with the upper end of the pipe even though said upper end may be out of axial alignment with the well bore.

In the drawing,

Figure 1 shows a vertical, sectional view of the tool showing the grapple in angular relation with the axis of the bore.

Figure 2 shows a vertical, sectional view of the tool.

Figure 3 shows a side elevation of the tool, partly in section, taken at right angles to the view shown in Figure 2.

Figure 4 shows a cross-sectional view, and

Figure 5 shows a side elevation of the tool in the well.

In the drawing the numeral 1 designates an operating string which extends to the ground surface and to the lower end of which a cylindrical joint member 2 is connected. This joint member 2 has a cylinder 3 in its upper end in which there is a plunger 4. A rack member 5 is attached to and depends from said plunger and is in mesh with and drives the spaced spur gears 6, 6, which in turn are in mesh with and drive the spur gears 7, said gears being housed within the coupling member 2.

The lower end of the coupling member 2 is bifurcated forming the spaced hinge members 8, 8.

The numeral 9 designates a lower coupling member whose upper end is fitted between the hinge members 8 and is pivotally connected therein by means of a cross pin 10. The upper end of the lower coupling member 9 has an arcuate rack face 11 in mesh with the spur gears 7.

Any suitable type of grappling tool as 12 may be attached to the lower coupling member 9 as shown in Figure 7. This grappling tool is designed to engage with the pipe, or other object, 13, in the well.

The tool has a water course leading through a pipe 14 from within the operating string and passing on downwardly through the plunger 4 and between the gears 6, 6 and 7, 7, and on down through a slot in the upper end of the lower coupling member 9, through the pin 10, to which the lower end of pipe 14 is anchored. The water course passes on down through the tubular lower coupling member 9 and fishing tool so that washing fluid at any and all times may be forced down through the tool into the well beneath. This fluid pressure may be built up against the plunger 4 so as to force it downwardly to actuate the gears 6 and 7 and to thus change the angular relation of the fishing tool relative to the bore so that the fishing tool may be brought into engagement with the pipe 13 and said pipe 13 may be brought into vertical position by a suitable manipulation of the tool and the grapple then firmly engaged with the pipe 13 and the latter then pulled from the well bore. The lower end of the pipe 14 may be provided with a choke 15, if desired, to increase the pressure above the plunger 4.

As above indicated any type of grappling tool may be employed and associated therewith, a conventional type of wall hook may be used to engage with the pipe 13 to bring it into vertical position so that the grapple may be more readily engaged with said pipe.

The drawing and description are illustrative merely while the broad principle of the invention will be defined by the appended claims

What I claim is:

1. An apparatus of the character described comprising a pair of joint members pivoted together, one of said members being adapted to be connected to a tubular operating string and having a cylinder, a tool connected to the other member, a plunger in the cylinder exposed to the pressure of an operating liquid in the string, gearing between the plunger and said other member whereby the axial relation of said members may be varied in accordance with the movements of the plunger.

2. An apparatus of the character described comprising a pair of joint members pivoted together, one of said members being adapted to be connected to a tubular operating string and having a cylinder, a grappling tool connected to the other member, a plunger in the cylinder exposed to the pressure of an operating liquid in the string, a rack member on the plunger, a train of gearing housed within the apparatus to which said rack member is geared and an arcuate rack member on the pivoted end of said other member in mesh with said gearing whereby the axial relation of the members may be varied in accordance with the movements of the plunger.

GEORGE A. LOWREY.